US00RE45172E

(19) United States
(12) Reissued Patent
Kushnirov

(10) Patent Number: US RE45,172 E
(45) Date of Reissued Patent: Sep. 30, 2014

(54) NECKPAD COMMUNICATIONS SYSTEM FOR A HELMET

(71) Applicant: Cardo Systems, Inc., Pittsburgh, PA (US)

(72) Inventor: Abraham Kushnirov, Ra'Anana (IL)

(73) Assignee: Cardo Systems, Inc., Pittsburgh, PA (US)

(21) Appl. No.: 14/177,992

(22) Filed: Feb. 11, 2014

Related U.S. Patent Documents

Reissue of:
(64) Patent No.: 8,233,947
Issued: Jul. 31, 2012
Appl. No.: 12/427,998
Filed: Apr. 22, 2009

U.S. Applications:
(60) Provisional application No. 61/046,968, filed on Apr. 22, 2008.

(51) Int. Cl.
*H04M 1/00* (2006.01)

(52) U.S. Cl.
USPC ..... 455/575.2; 455/90.3

(58) Field of Classification Search
USPC ..... 455/575.2, 90.3, 575.1, 90.2
See application file for complete search history.

(56) References Cited

U.S. PATENT DOCUMENTS

| | | | |
|---|---|---|---|
| 3,983,483 | A | 9/1976 | Pando |
| 4,084,139 | A | 4/1978 | Jakobe |
| 4,130,803 | A | 12/1978 | Thompson |
| 4,152,553 | A | 5/1979 | White |
| 4,424,880 | A | 1/1984 | Murayama et al. |
| 4,620,068 | A | 10/1986 | Wieder |
| 4,727,599 | A | 2/1988 | Rappaport et al. |
| 5,034,995 | A | 7/1991 | Ciccone |
| 5,119,505 | A | 6/1992 | Tisseront et al. |
| 5,291,880 | A | 3/1994 | Almovist et al. |
| 5,410,746 | A | 4/1995 | Gelber |
| 5,438,698 | A | 8/1995 | Burton et al. |
| 5,537,667 | A | 7/1996 | Kenning et al. |
| 5,678,205 | A | 10/1997 | Gray |
| 5,790,681 | A | 8/1998 | Leppalahti |
| 6,062,337 | A | 5/2000 | Zinserling |

(Continued)

FOREIGN PATENT DOCUMENTS

WO WO 02/076253 10/2002

OTHER PUBLICATIONS

International Search Report and Written Opinion of the International Searching Authority for PCT/US08/62421 dated Aug. 21, 2008.

(Continued)

*Primary Examiner* — Peguy Jean Pierre
(74) *Attorney, Agent, or Firm* — Leason Ellis LLP

(57) ABSTRACT

A neckpad communications system for a helmet includes a neckpad body that includes coupling members for detachably coupling the neckpad body to a surface of the helmet. The system includes a communications unit having a first part that is disposed within and covered by the neckpad body and is configured to permit audio communication with another remote device and a second part including audio transducers located at least partially outside the neckpad body. The audio transducers are operatively connected to the communications unit and can include at least one speaker and a microphone. The neckpad body includes cushioning to allow it to be worn against a user's body and includes controls associated with the communications unit that are accessible exteriorly.

32 Claims, 7 Drawing Sheets

(56) References Cited

U.S. PATENT DOCUMENTS

| | | | |
|---|---|---|---|
| 6,308,343 | B1 | 10/2001 | Arai |
| 6,978,162 | B2 | 12/2005 | Russell et al. |
| 7,292,880 | B2 | 11/2007 | Lehtonen |
| 7,444,117 | B2 | 10/2008 | Katayama et al. |
| 7,616,774 | B2 | 11/2009 | Lazzeroni et al. |
| 2001/0044329 | A1 | 11/2001 | Newsom |
| 2004/0261158 | A1 | 12/2004 | Depew et al. |
| 2005/0153750 | A1 | 7/2005 | Gantz et al. |
| 2005/0285799 | A1 | 12/2005 | Leinonen et al. |
| 2006/0057972 | A1 | 3/2006 | Wikel et al. |
| 2006/0147052 | A1 | 7/2006 | Wikel et al. |
| 2006/0293092 | A1 | 12/2006 | Yard et al. |
| 2007/0248238 | A1 | 10/2007 | Abreu |

OTHER PUBLICATIONS

Dainese Youtube Channel, "Dainese Airstream Course D-Nect Infinity," youtube website, posted Jun. 4, 2007, 5 pages comprising video main page and screen shots.

Dainese.com, "D-Nect Infinity Freedom of speech," dainese wesbsite, (undated) 3 pages.

Webbikeworld, "Dainese Launches Infinity Bluetooth Helmet," webbikeworld website, May 14, 2007, 4 pages.

Dainese, "DNect Evo 2.0 System User's Instructions," DNect Evo 2.0 Manual, Rev.00 DEL Jan. 2007, 13 pages (front and rear cover pages plus pages English version of manual), Molvena, Italy.

JOE250, "Gear Review—Dainese Airstream Corsa (Bluetooth)," joe250 website, motorcycles/dainese/airstream-course page, undated (printed Feb. 11, 2014), 4 pages.

Wasef, Basem, "Dainese Airstream Course D-Nect Bluetooth Helmet," motorcycles.about.com website, undated (printed Feb. 11, 2014), 3 pages.

Dainese Betazone, "Dainese Beta Tester invitation page," betazone.dianese website (retrieved from Internet Archive), circa 2007 (printed Dec. 4, 2013), 1 page (including translation from Italian).

Yamaha Motor Italia, S.p.A., "BYE Bluevoice Liberta di parola," Product Catalog, undated (assume for purposes of this IDS that this is prior to Apr. 22, 2009), 5 pages.

Yamaha Motor Italia, S.p.A., "Bye Blue Voice. Basta Con Le Parole Al Vento," Yamaha Motor Italia website, Jul. 21, 2006, 3 Pages (including informal translation from Italian).

Yamaha Motor Italia, S.p.A., "Voglio Mettermi Il Casco!," Yamaha Motor Italia website, Nov. 15, 2006, 3 Pages (including informal translation from Italian).

NECKPAD COMMUNICATIONS SYSTEM FOR A HELMET

Matter enclosed in heavy brackets [ ] appears in the original patent but forms no part of this reissue specification; matter printed in italics indicates the additions made by reissue.

CROSS-REFERENCE TO RELATED APPLICATION

This application claims the benefit of U.S. provisional patent application Ser. No. 61/046,968, filed Apr. 22, 2008, which is hereby incorporated by reference in its entirety.

TECHNICAL FIELD

The present invention relates to communication systems and more particularly, relates to a communication system that fits within the confines of a helmet which is worn during various activities and provides a wired or wireless connection to the helmet from a separate source of intercommunications or entertainment system.

BACKGROUND

It will be appreciated that there are number of different types of helmets that are used across many different industries; however, they all are a form of protective gear. For example, wearing hard hats is standard practice when working in construction site, as well as when operating heavy industrial equipment, etc. Sports athletes, such as baseball and football players, also wear helmets for protection and it is one of the most critical pieces of equipment for a professional race car driver. Helmets are also used in the military services. One type of helmet that is one of the more commonly seen is a motorcycle helmet. Motorcycle riding helmets are very sophisticated and specialized for the activity.

In recent years, helmet wearers have encountered a wide array of methods by which audio content can be delivered to and transmitted from a helmet, such as a motorcycle or racing car helmet, for example, but not intended to exclude other types of helmets and applications. In most applications, it is very difficult to fit electronic equipment, including speakers and the like, within the tight confines of the helmet due to the presence of protective head padding. In addition, the installation and removal of such equipment is also a challenge.

As is well known, Bluetooth is an industrial specification for wireless personal area networks (PANs). Bluetooth provides a way to connect and exchange information between devices, such as mobile phones, laptops, personal computers, printers, GPS receivers, digital cameras and video game consoles over a secure, globally unlicensed short-range radio frequency. One of the more prevalent applications of Bluetooth is the wireless control of and communication between a mobile phone and a hands-free headset that allows the transfer of sound data between the two devices.

The present assignee has a product that is commercially available under the trade name scala-rider. This product is a wireless communications unit that is adapted to be attached to a helmet and includes a device that interfaces with the Bluetooth functionality of the user's mobile phone. The scala-rider product includes the headset unit (wireless communications unit) that includes the electronics that allow for the wireless communications and a clamp that is configured to mate with and be securely attached to the helmet. The clamp also has an electronic connector portion and includes a wired microphone and a wired speaker. The clamp resembles a cradle that receives and the headset unit such contacts of the headset unit are electrically connected to contacts of the electronic connector of clamp. The clamp serves as the base for the headset and is attached to the helmet before using the headset.

The clamp is attached to the helmet by loosening screws of the clamp and then sliding a back-plate of the clamp between the internal padding and the external shell of the helmet. The clamp is adjusted to a desired location for the user where the speaker sits opposite the user's ear and the microphone is located opposite the corner of the user's mouth. The screws are then fastened to lock the clamp in place and then the headset is slide is slid along the clamp until it snap-lockingly mates therewith. To remove the headset unit (e.g., for security purposes), the back-plate is pressed to allow the headset unit to slide up.

While the above product performs its intended function, there is a perceived need to provide a communications device that mounts to a helmet in a different manner than by securely attached to the shell of the helmet.

SUMMARY

A neckpad communications system for a helmet includes a neckpad body that includes coupling members for detachably coupling the neckpad body to a surface of the helmet. The system includes a communications unit having a first part that is disposed within and covered by the neckpad body and is configured to permit audio communication with another remote device and a second part including audio transducers located at least partially outside the neckpad body. The audio transducers are operatively connected to the communications unit and can include at least one speaker and a microphone. The neckpad body includes cushioning to allow it to be worn against a user's body and includes controls associated with the communications unit that are accessible exteriorly.

In operation, the communications unit can coordinate signals in analog or digital form between the audio transducers (microphone, speakers, etc.) associated with the neckpad and other communications devices. For instance, the communications unit can coordinate signals from a cellular phone having a compliant communication protocol (e.g., Bluetooth). Also, the communications unit can coordinate signals provided by multiple compliant devices, such as music players (MP3) and navigation systems (e.g., the type that provide aural navigation instructions). Coordination can include muting one audio source or assigning priorities as between the various devices.

BRIEF DESCRIPTION OF THE DRAWING FIGURES

The foregoing and other features and advantages of the present invention will be more readily apparent from the following detailed description and drawings of the illustrative embodiments of the invention wherein like reference numbers refer to similar elements and in which.

DETAILED DESCRIPTION OF EMBODIMENTS

In accordance with one embodiment of the present invention, a neckpad communications system 100 for use with a helmet 200 is shown in FIGS. 1-8. While the helmet 200 that is illustrated in FIGS. 1-8 is a motorcycle riding helmet, it will be understood that the helmet 200 is not limited to being of such a helmet type; but rather, the helmet 200 can be any number of other types of helmets, e.g., race car helmets, sports helmets, etc.

Figure 1:
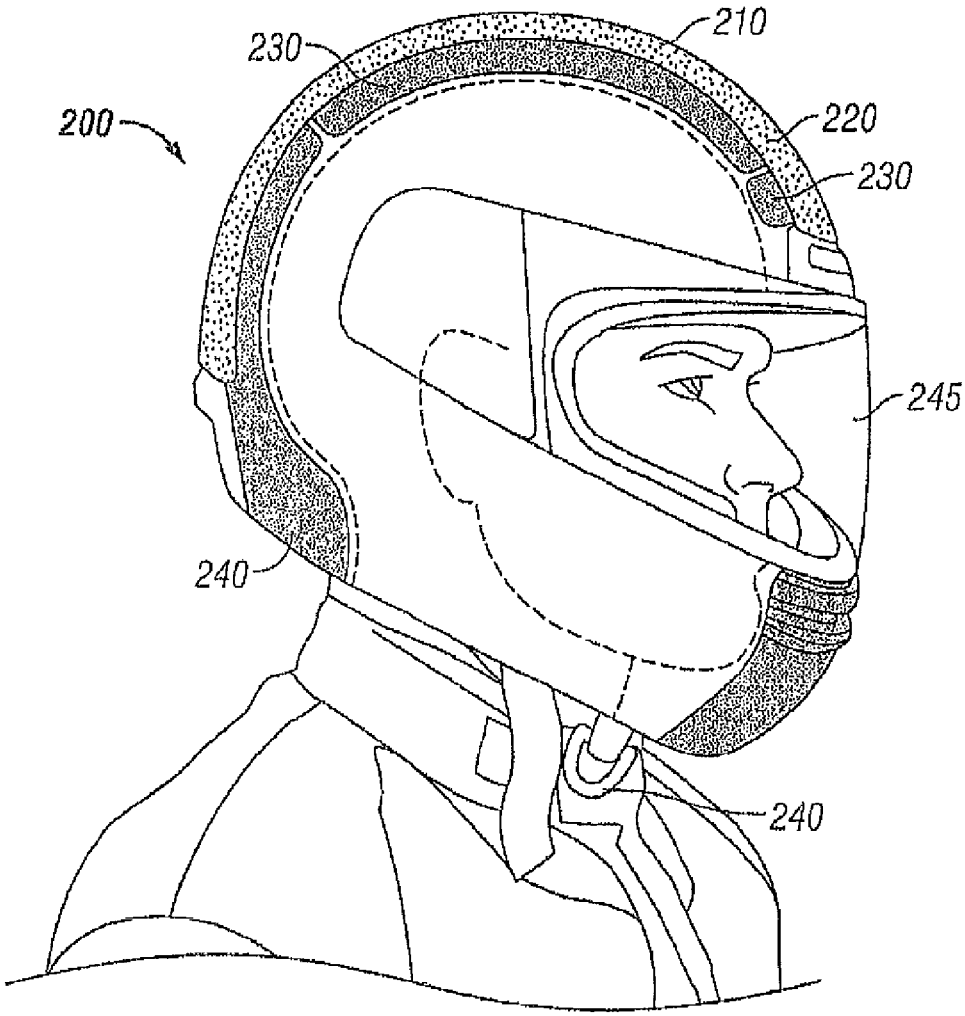
FIG. 1 (Prior Art)
FIG. 1 is a cross-sectional view of components of a conventional helmet.
Figure 2:
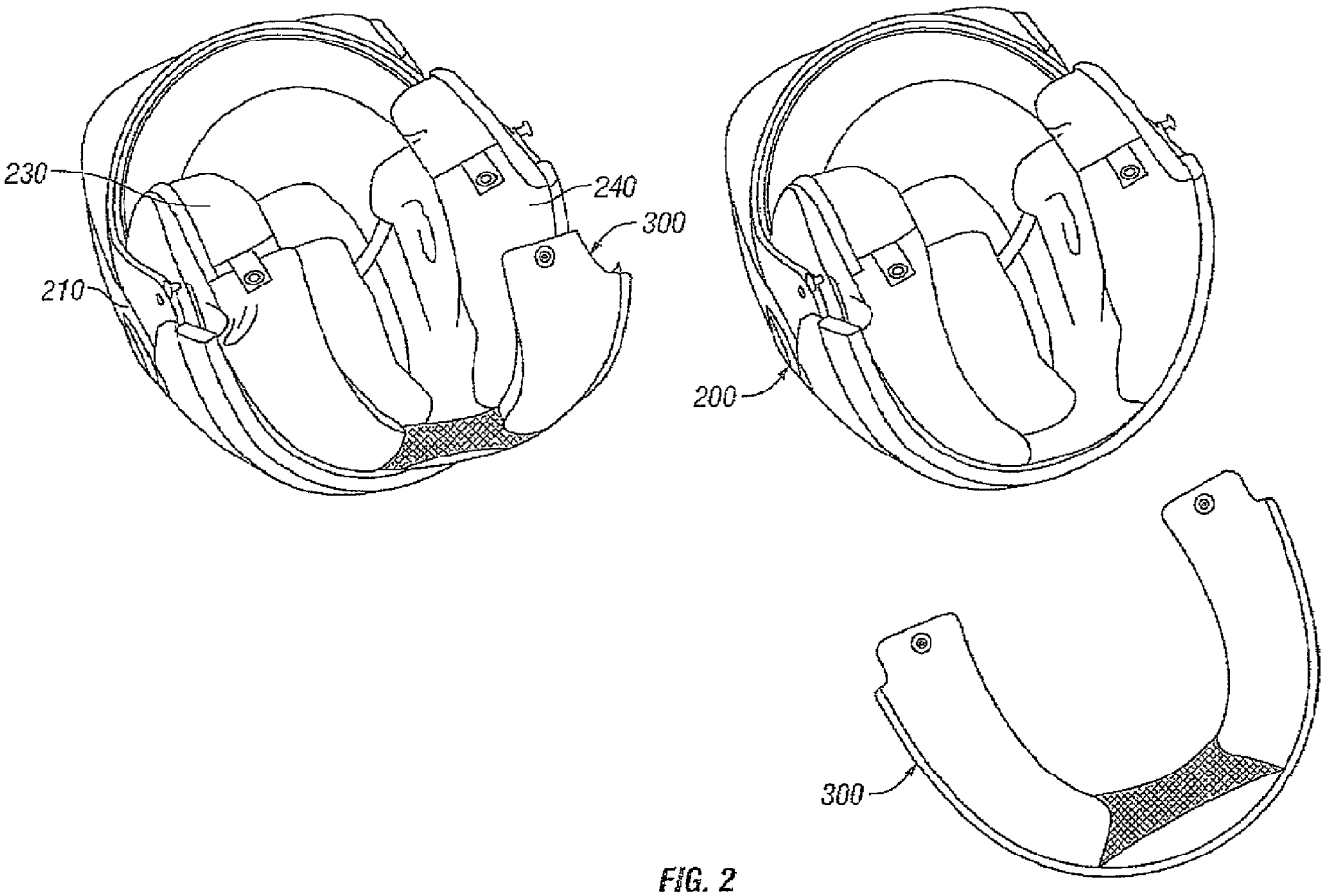
FIG. 2 (Prior Art)
FIG. 2 is a bottom perspective view of the helmet showing removal of a conventional neckpad.

As shown in FIGS. 1-2, the helmet 200 typically is formed of the following basic components that work together to provide protection in the helmet: an outer shell 210; an impact-absorbing liner 220; comfort padding 230; and a good retention system 240. The outer shell 210 is usually made from a fiber-reinforced composite or thermoplastic. The outer shell 210 is a rigid structure yet it is designed and intended to compress when the outer shell 210 strikes anything hard. That action disperses energy from the impact to lessen the force before it reaches the user's head. However, the outer shell along cannot protect the user from such force.

Inside the outer shell 210 is the equally important impact-absorbing liner 220 that is usually made of expanded polystyrene or some other similar energy absorbing material. This dense layer made up of the liner 220 cushions and absorbs the shock as the helmet 200 stops and the user's head wants to keep moving. Both the outer shell 210 and liner 200 compress if hit hard, spreading the forces of impact throughout the material forming the helmet 200. The more impact-energy deflected or absorbed, the less there is of it to reach the user's head and do damage.

The comfort padding 230 is the soft-foam and cloth layer that sits next to the wearer's head. It keeps the wearer feeling comfortable and the helmet 200 fitting snugly on the wearer's head. In a number of helmets 200, the comfort padding 230 can be taken out for cleaning.

The retention system 240 which is in the form of a chin strap is very important since it is the one piece that keeps the helmet on the head of the user in a crash. The strap 240 is connected to each side of the outer shell 210.

The helmet 200 will most likely include other parts, including a face shield 245 for protecting the eyes and face from debris and windblast and permits good vision.

As shown in FIG. 2, the comfort padding 230 often includes a neck padding 300 that is typically detachably connected to the base comfort padding 230. More specifically, the comfort padding 230 wraps around the sides and back of the wearer's head and includes a bottom surface or face 240 that faces the shoulders of the wearer. The neck padding 300 is a generally U-shaped component that is located along the bottom surface 240. As described below, the neck padding 300 is many times detachably attached to the bottom surface 240 by using conventional means, including but not limited to snap-fit fasteners and other mechanical fastening means, including hook-and-loop type fasteners.

As shown in FIGS. 2-6, the neck padding 300 is generally U-shaped and includes a pair of free ends 302, 304 that are spaced apart from one another so that the wearer's neck can be received within a space 306 that is located between the free ends 302, 304. The neck padding 300 includes a top surface or face 310 that faces the bottom surface 240 of the comfort padding 230 when the neck padding 300 is attached thereto. In addition, the neck padding 300 includes a generally opposite bottom surface or face 320 that faces the wearer's shoulders when the helmet 200 is worn.

Figure 3:
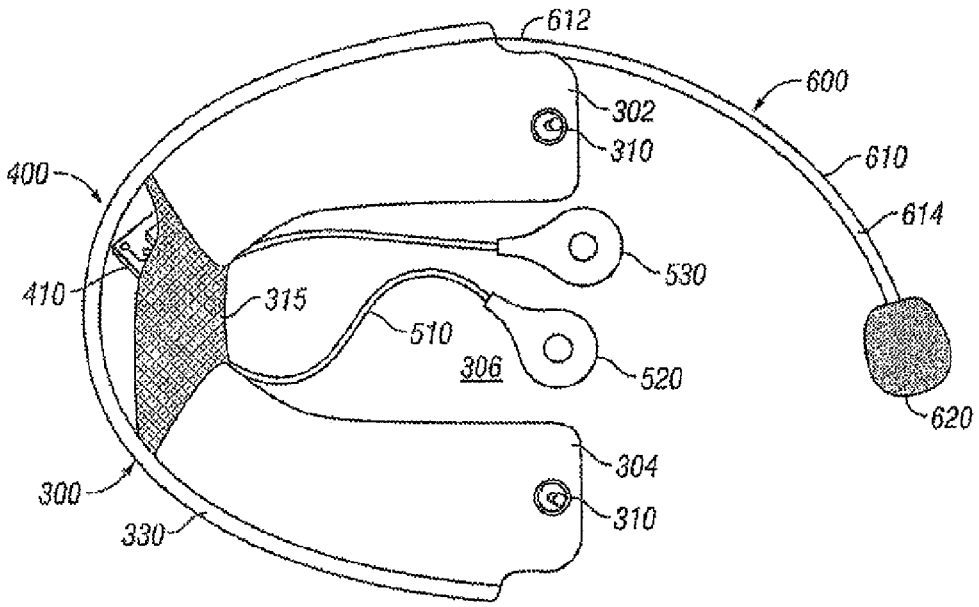
FIG. 3 is a top plan view of a neckpad communications system according to one embodiment of the present invention.
Figure 4B:
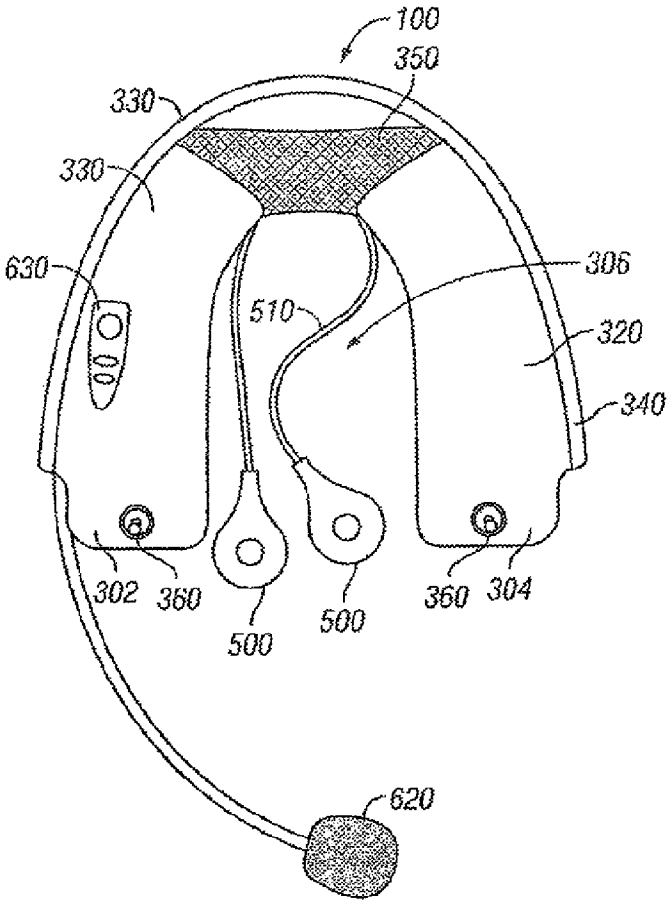
FIG. 4 is a bottom plan view of the neckpad of FIG. 3.
Figure 4A:
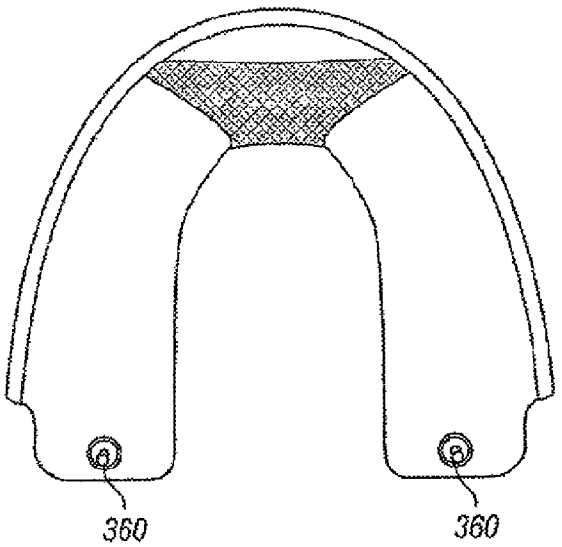
Figure 5:
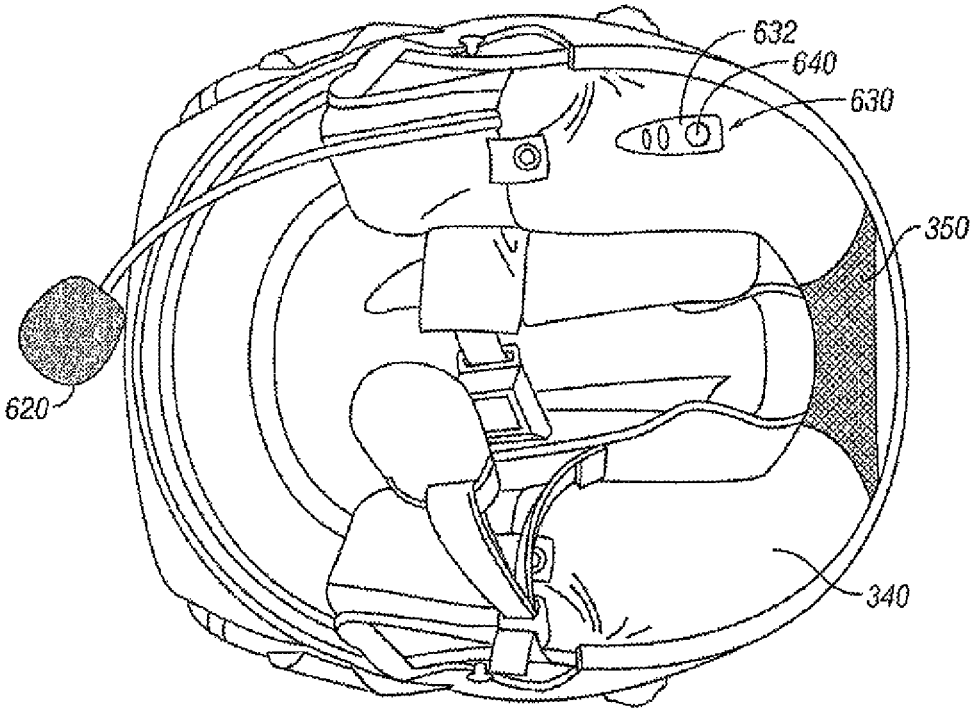
FIG. 5 is a bottom view of the neckpad communications system of FIG. 3 attached to the helmet of FIG. 2.
Figure 6B:
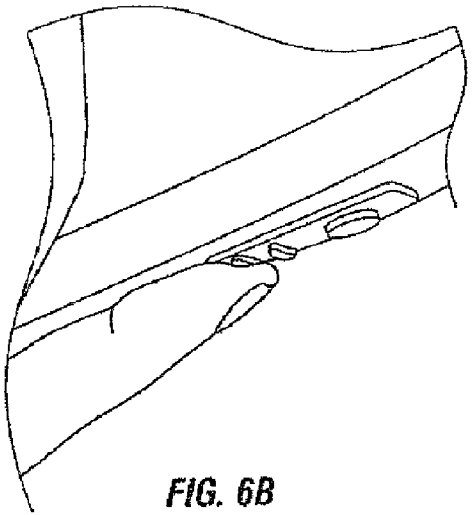
FIG. 6 is a side elevation view of the helmet and neckpad of FIG. 5.
Figure 6A:
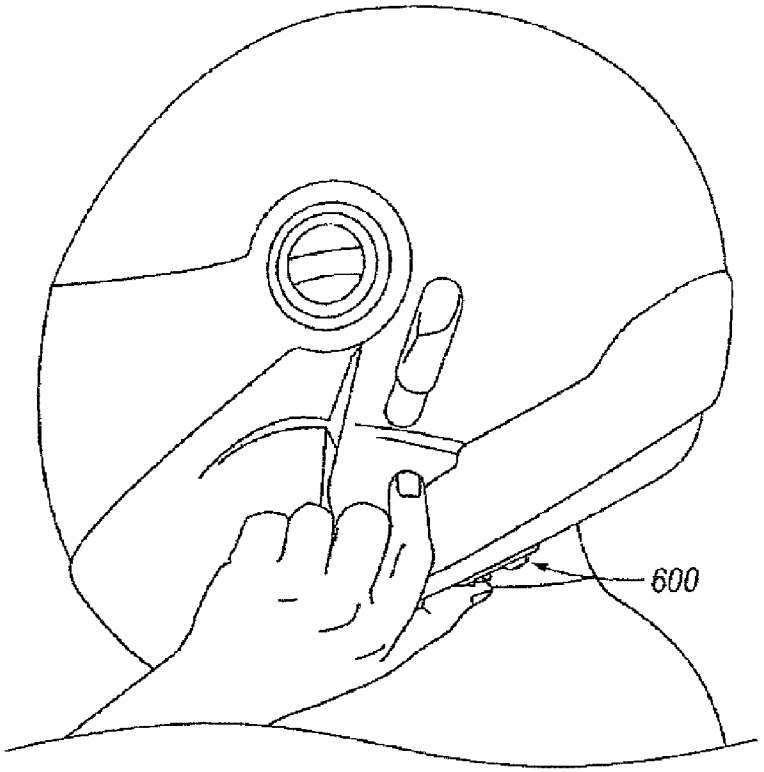

As shown in FIGS. 3-5, the neck padding 300 can be formed of more than one material and include different sections that perform different functions. For example, the top face 310 of the neck padding 300 can include a pair of comfort or padded sections 310 that are formed of the same or similar material that is used to make the base comfort padding 230. The padded sections 310 are located along the legs of the neck padding 300 at the free ends 302, 304 of the neck padding 300. In between the padded section 310 at the base portion of the U-shaped structure between the legs thereof, the neck padding 300 can include a vent portion 315. Since the vent portion 315 is designed to allow some venting, it is formed of a different material compared to the padded sections 310 and in particular, the vent portion 320 can be formed of a mesh material.

The top face 310 and the bottom face 320 can be formed of two different layers that are attached to one another along a peripheral seam 330. For example, piping or the like can be provided along the peripheral seam 330 as a means for attaching the layers of the top face 310 and bottom face 320. Alternatively, as shown, a small amount of edging of one face can be wrapped over the other face and provides an edge that can be used to attach the two layers of material.

The bottom face 320 can also be formed to have different material sections. In addition, the bottom face 320 is exposed to the environment and potentially to the elements (e.g., weather, etc:) and therefore, should be formed of a material that is weather resistant or even weather proof. Similar to the top face 310, the bottom face 320 can include a pair of end or leg sections 340 that are located along the legs of the neck padding 300 at the free ends 302, 304 of the neck padding 300. The end sections 340 can be a padded structure that is covered with a vinyl or soft plastic material or the like. In between the end section 340 at the base portion of the U-shaped structure between the legs thereof, the bottom face 320 of the neck padding 300 can include a vent portion 350 that is similar to the vent portion 315. As with the vent portion 315, the vent portion 350 can be formed of a mesh material. The vent portion 350 can be formed of at least to two different materials, one of which is a mesh material.

At or near the two free ends 302, 304, a pair of fasteners 360 or the like is provided as a means for attaching the neck padding 300 to the base comfort padding 230 in a detachable manner. The fasteners 360 can be provided at or near the ends 302, 304 along the bottom face 320. Any number of different types of fasteners 360 can be used to detachably attach the neck padding 300 to the comfort padding 230. For example, the fasteners 360 can be in the form of a pair of snap fasteners (interlocking parts that snap into engagement until a certain amount of force is applied) that are of one type that snap-lockingly mates with complementary snap fasteners that are associated with the comfort padding 230. The bottom surface 240 of the comfort padding 230 can include the complementary snap fasteners. To detachably attach the neck pad 300 to the comfort padding 230, the neck pad 300 is positioned with its bottom face 320 facing downward and the snap fasteners are mated with one another resulting in attachment therebetween.

In accordance with the present invention, the neck pad 300 is configured so that it includes an electronic communications system 400 that allows communication with another component, such as a mobile telephone. For example and as described in detail below, the electronic communications system 400 is configured to be part of a Bluetooth communications system in which the communications system 400 that is part of the neck pad 300 communicates wirelessly with another device, such as a Bluetooth capable mobile telephone. However, it will be appreciated that the communications system 400 is not limited to being a Bluetooth compatible device but instead, is broadly is a communications module that permits for wired or wireless communication with another device.

Unlike conventional systems, where a principle part of the communications system is secured directly to the outer shell 210 of the helmet 200, the neck pad 300 is the member that carries the components of the communications system 400. More specifically, the communications system 400 includes electronics 410, including a printed circuit board, a battery, etc., and is constructed so that it is disposed in a concealed location. For example, the electronics 410 can be located between the two layers (top and bottom faces 310, 320) so that they are not visible to the wearer. In the illustrated embodiment, the electronics 410 are located within the base portion of the U-shaped structure between the legs thereof. For instance, the electronics 410 can be at least partially covered with the mesh material. Meanwhile controls associated with the communications system are affixed on the exterior of the neckpad and are accessible by the user.

In yet another embodiment, the electronics 410 can be located in compartment that can be at least selectively accessed under different circumstances in order to access the electronics 410. For example, the neck padding 300 can has a slit or the like through which the electronics 410 can be accessed. The slit can be opened or closed to maintain the electronics 410 within the compartment. For example, the slit can be part of a zipper assembly that permits the operator to simply unzip the zipper to access the electronics 410 in case of malfunction or maintenance, such as battery replacement. Alternatively, the slit can be closed with hook-and-loop type fasteners which similarly can be disengaged to allow access to the electronics 410. To remove the electronics 410, components that are connected thereto are disengaged first or if simple battery replacement is needed, the electronics 410 can be moved to allow access to the battery compartment without disconnecting the other components.

The electronics 410 include at least one speaker 500 that is connected via a wire 510 to the printed circuit board, etc. In the illustrated embodiment, there are two speakers 500 one for each ear of the wearer. A fear face 520 of the at least one speaker 500 can include a mechanical fastener 530, such as a hook and loop type fastener, that permit the speaker 500 to be attached to a target location within the helmet 200. In other words, the hook and loop fasteners 530 of the speakers 500 are of a type that can be attached to the inner material of the helmet 200 by simply pressing the speakers 500 against the inner material at locations that are opposite the ears of the wearer when the helmet 200 is worn. The wires 510 of the speakers 500 are slightly spaced from one another with one being closer to one leg and the other being closer to the other leg. For example, one wire 510 protrudes outwardly from the mesh material near the boundary between the vent portion 320 and one padded section 310 and the other wire 510 protrudes outwardly from the mesh material near the boundary between the vent portion 320 and the other padded section 310. The wires 510 are long enough to permit the speakers 500 to be lifted upwardly and properly positioned along the sides of the comfort padding of the helmet 200. An opposite front face 530 of the speaker 500 includes a soft fabric cover over the speaker itself since this front face 530 seats against or proximate to the wearer's ear.

The electronics 410 also includes a microphone 600 that is operatively connected to the printed circuit board, etc. The microphone 600 includes a flexible boom 610 that has a first end portion 612 that is coupled to the neck pad 300 and an opposite second end portion 614 includes the microphone unit 620 into which the wearer speaks. The boom 610 is formed of a flexible material so as to allow optimal positioning of the microphone 620 to the wearer's mouth. As illustrated, the first end portion 612 is coupled to one leg (e.g., first end 302) of the U-shaped neckpad 300 adjacent a free end of the neckpad. For example, the first end portion 612 can be positioned along an outer perimeter edge (e.g., at or near the seam of the two layers) of the neckpad 300. The boom 610 is thus typically bent inward so that it extends across the first end 302 and the space 306 between the two legs of the neckpad 300.

Collectively, the speakers 500 and microphone 600 comprise audio transducers.

The electronics 410 also include a control panel or controller 630 having controls that allow the wearer to control the communications system. The control panel 630 is formed on the bottom face 320 of the neck pad along one leg thereof near one free end of the neckpad 300.

The control panel 630 is operatively connected to the printed circuit board via wires or an unpluggable wiring harness or seat or could comprise a wireless remote module. The control panel 630 includes a number of different buttons that control the functionality of the communications system. The control panel 630 is defined by a body 632 and at least one and typically a plurality of control buttons. For example, the control panel 630 can include a control button 640 which when pressed anywhere within range of the other Bluetooth device (e.g., mobile phone) causes the power to be turned ON/OFF and allows the user to accept or initiate calls. In addition, the control panel 630 also includes a volume down button 650 and a volume up button 660. The buttons include indicia to indicate their functionality. For example, a telephone symbol for the button 640, a minus symbol for the button 650 and a plus symbol for the button 660.

In the illustrated embodiment, the control panel 630 is located on the underside of the same leg that has the microphone boom 610 extending outwardly therefrom and is exteriorly accessible. When the neck pad 300 is worn in its normal wearing position, attached to the bottom face 240 of the comfort padding 230, the control panel 630 faces downward and is located nearer the free end 302 so that it is easily accessible and can manipulated by the user.

It will be appreciated that in the above design, the electronics parts are disposed within the neckpad 300 itself and the neckpad 300 is designed to be attached to a range of existing helmets. In other words, the neckpad 300 can easily be retrofitted and used on a wide number of helmet designs.

Figure 7:
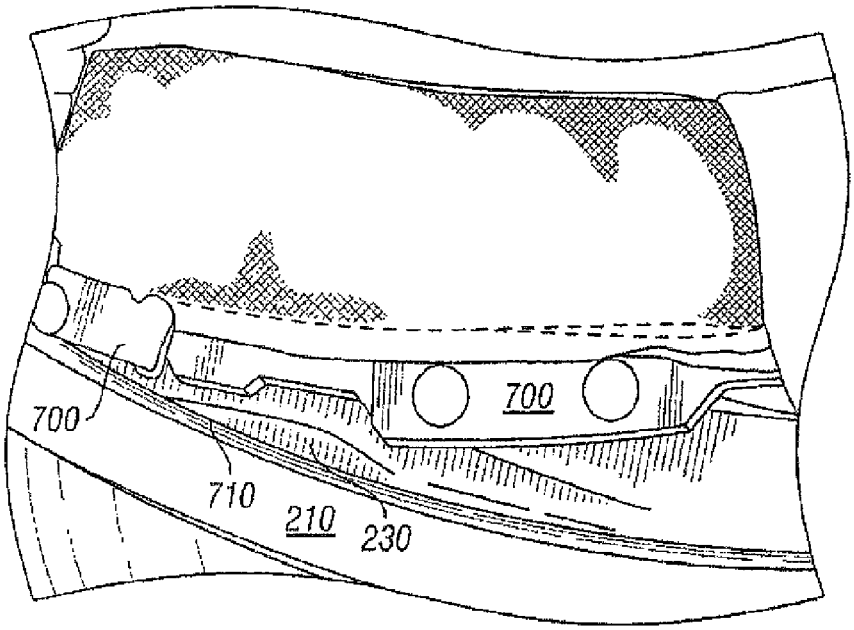
FIG. 7 is a close-up perspective of a coupling feature according to one embodiment.

It will be appreciated that a number of different means can be used for coupling the neckpad 300 to the helmet 200. For example, snap fasteners, such as those described above, can be used to at least partially or completely couple the neckpad 300 to the helmet 200. However, any number of other coupling means can be used to securely attach the neckpad 300 to the helmet 200. The coupling means can include hook-and-loop fasteners, clips, and other mechanical fit type structures. As shown in FIG. 7, the coupling or attachment means can include a rigid rim or tab structure 700 that is designed to be inserted into a groove 710 between the shell 210 and the comfort padding 230. As shown in FIG. 7, the structure 700 can be defined by a number of spaced apart rigid tabs 700 that extend outwardly from the peripheral edge of the neckpad 300. The spaced apart tabs 700 are manipulated and bent downwardly into the groove 710 (space) between the shell 210 and comfort padding 230.

Figure 8:
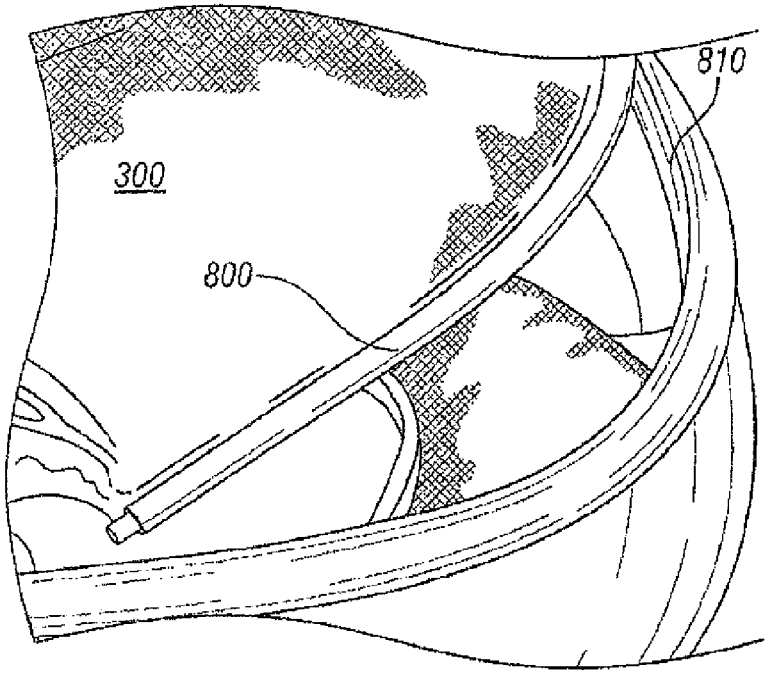
FIG. 8 is a close-up perspective of a coupling feature according to another embodiment.

In yet another embodiment that is shown in FIG. 8, the neckpad 300 includes a flexible tube 800 that extends at least partially around the peripheral edge of the neckpad 300. To securely couple the neckpad 300 to the helmet 200, the flexible tube 800 is inserted into a groove 810 that is located at the edge of the helmet rim. This results in the neckpad 300 being securely coupled to the helmet 200. It will be appreciated that the tube 800 can be attached along the perimeter edge of the neckpad 300 or the seam along which the two layers are attached can be constructed to include a pocket through which the flexible tube is inserted.

It will also be understood that a combination of different attachment means can be used or a single attachment means can be used for attaching the neckpad 300 to the helmet 200. Moreover, the above described means for attaching the neckpad 300 to the helmet 200 are merely exemplary and are non-limiting as to the manner of attaching the neckpad 300 to the helmet 200.

By disposing the electronics within the neckpad 300, the communications system is not only easily retro-fittable with a number of different, commercially available helmets but also can easily be removed from the helmet for security purposes. To install the neckpad communications system 100, an existing neckpad of the helmet is simply removed and then the neckpad 300, with the communications system 400 contained therein, is simply detachably connected to the inner padding of the helmet. To remove it, the means for attaching the neckpad to the helmet is simply disengaged.

Once again, the communications system described herein is not limited to being a Bluetooth type device but instead can broadly be thought of as an audio communications system. In operation, the communications system can coordinate signals in analog or digital form between the audio transducers (microphone, speakers, etc.) associated with the neckpad and other communications devices. For instance, the communications system can coordinate signals from a cellular phone having a compliant communication protocol (e.g., Bluetooth). Also, the communications system 400 can coordinate signals provided by multiple compliant devices, such as music players (MP3) and navigation systems (e.g., the type that provide aural navigation instructions). Coordination can include muting one audio source or assigning priorities as between the various devices.

It will also be appreciated that a removable cover can be used around the neckpad to protect the neckpad during use.

While exemplary drawings and specific embodiments of the present invention have been described and illustrated, it is to be understood that the scope of the present invention is not to be limited to the particular embodiments discussed. Thus, the embodiments shall be regarded as illustrative rather than restrictive, and it should be understood that variations may be made in those embodiments by workers skilled in the art without departing from the scope of the present invention as set forth in the claims that follow, and equivalents thereof. In addition, the features of the different points set forth below may be combined various ways in further accordance with the present invention.

What is claimed is:

1. A neckpad communications system for a helmet comprising:

a neckpad body formed of padding and including coupling members for detachably coupling the neckpad body to a surface of the helmet; and a communications unit having a first part that is disposed within and covered by padding of the neckpad body and is configured to permit audio communication with another remote device and a second part including audio transducers located at least partially outside the neckpad body, the audio transducers being operatively connected to the communications unit, wherein the audio transducers include at least one speaker and a microphone, the speaker being movably attached to the communications unit via a wire to allow the speaker to be positioned and repositioned relative to the body, the speaker including a means for detachably attaching one surface of the speaker to a surface of inner comfort padding of the helmet to allow placement proximate a wearer's ear, wherein the neckpad body and communications unit form an integral standalone product, separate from the helmet, for attachment to the helmet such that the communications unit is carried by the neckpad body when the neckpad body is detached from the helmet.

2. The neckpad of claim 1, wherein the neckpad body includes cushioning to allow it to be worn against a user's body and includes controls associated with the communications unit that are accessible exteriorly.

3. The neckpad of claim 1, wherein the means for attaching comprises a mechanical fastener formed on the one surface.

4. The neckpad of claim 1, wherein the electronic unit supports Bluetooth functionality.

5. The neckpad of claim 1, wherein the other device comprises a hand-held mobile communications device or audio equipment.

6. A neckpad communications system for a helmet comprising:

a padded body having a first surface and an opposite second surface and two free ends, the padded body being a separate part from the helmet and is configured to be removed therefrom;

an electronic communications unit that is disposed within the body such that the electronic communications unit is carried by the padded body when the padded body is detached from the helmet, the electronic communications unit being operatively connected to a microphone and a speaker that are freely movable relative to the body and is configured to permit communication with another device;

a control panel that is disposed along the second surface of the padded body spaced from the electronic communications unit, the control panel being operatively connected to the electronic communications unit for controlling operation thereof; and audio transducer components that are operatively connected to the communications unit and are at least partially disposed exteriorly to the neckpad body;

wherein the microphone includes a flexible boom that is coupled to one free end of the body and extends outwardly therefrom and can be bent to allow for optimal positioning of the microphone to a wearer's mouth, the microphone itself being separate and spaced from the body.

7. The neckpad of claim 6, wherein the communications system includes a power source, a printed circuit board and a speaker and a microphone that are operatively connected to the printed circuit board.

8. The neckpad of claim 6, wherein the means for attaching the neckpad body to the helmet includes a member that creates a mechanical attachment with the helmet.

9. The neckpad of claim 8, wherein the mechanical attachment is selected from the group consisting of hook and loop fasteners, snap fasteners, and a member that is disposed within a space of the helmet to create a mechanical fit therebetween.

10. A neckpad communications system for a helmet comprising:

a body having a first surface and an opposite second surface and two free ends;

an electronic communications unit that is disposed within the body in a concealed position by being disposed between layers of padding material that forms the body, the electronic communications unit being operatively connected to a microphone and a speaker that are freely movable relative to the body and is configured to permit communication with another device;

a control panel operatively connected to the concealed electronic communications unit and spaced therefrom at a remote location of the body and exteriorly accessible along the second surface of the body; and wherein the microphone and speaker are operatively connected to the communications unit and are at least partially disposed exteriorly to the neckpad body and extend outwardly therefrom; wherein the body includes coupling members for detachably attaching the neckpad body to the helmet.

11. The neckpad of claim 10, wherein the microphone includes a flexible boom that is coupled to one free end of the body and extends outwardly therefrom.

12. The neckpad of claim 10, wherein the body includes a first layer that defines the first surface and a second layer that defines the second surface, the first and second layers being coupled to one another along a perimeter seam.

13. The neckpad of claim 12, wherein the first surface is disposed adjacent a bottom face of comfort padding of the helmet and the body is detachably attached to the comfort padding.

14. The neckpad of claim 12, wherein the electronic unit is concealed between the first and second layers.

15. The neckpad of claim 10, wherein the body is U-shaped and defined by a central section and two legs that are spaced apart from one another and include the two free ends, the microphone extending from one of the free ends.

16. The neckpad of claim 10, wherein the electronic unit includes a printed circuit board that is disposed within the central section, each of the microphone and the speaker being operatively connected by wires to the printed circuit board.

17. The neckpad of claim 16, wherein there are two speakers each of which includes a mechanical fastener that permit the speaker to be detachably attach to an inner surface of comfort padding of the helmet proximate the wearer's ear.

18. The neckpad of claim 17, wherein the mechanical fastener is of a hook and loop type.

19. The neckpad of claim 10, further including a control panel that is operatively connected to the electronic unit for controlling activation of the electronic unit and the volume of the speaker.

20. The neckpad of claim 19, wherein the control panel is located along a bottom surface of the neckpad body with an opposite top surface being attached to a bottom surface of comfort padding of the helmet.

21. The neckpad of claim 10, wherein the coupling members for attaching the neckpad to the helmet include a plurality of rigid tabs that are disposed within a groove formed between a shell and inner comfort padding of the helmet resulting in the neckpad body being securely, yet detachably, coupled to the helmet.

22. The neckpad of claim 10, wherein the coupling members for attaching the neckpad to the helmet include a flexible tube that at least partially extends about an outer peripheral edge of the neckpad and is received within a groove at an edge of a rim of the helmet.

23. The neckpad of claim 10, wherein the coupling members for attaching the neckpad to the helmet is in the form of at least one mechanical fastener.

24. The neckpad of claim 23, wherein the mechanical fastener is one of hook and loop fasteners and snap fasteners.

*25. A neckpad communications system for a helmet, comprising:*

*a padded body having a first surface and an opposite second surface, the padded body being a separate part from the helmet and is configured to be removed therefrom;*

*an electronic communications unit that is disposed within the body such that the electronic communications unit is carried by the padded body when the padded body is detached from the helmet, the electronic communications unit being operatively connected to a microphone and a speaker, and configured to permit communication with another device;*

*a control panel that is disposed along the second surface of the padded body spaced from the electronic communications unit and being accessible exteriorly of the padded body, the control panel being operatively connected to the electronic communications unit for controlling operation thereof;*

*audio transducer components comprising the microphone and the speaker that are operatively connected to the communications unit.*

*26. The neckpad communications system of claim 25, further comprising coupling members for detachably coupling the padded body to a surface of the helmet.*

*27. The neckpad communications system of claim 26, wherein the surface of the helmet comprises a comfort padding.*

*28. The neckpad communications system of claim 26, wherein the padded body and the electronic communications unit form an integral standalone product, separate from the helmet, for attachment to the helmet.*

*29. The neckpad communications system of claim 26, wherein the padded body includes a first layer that defines the first surface and a second layer that defines the second surface, the first and second layers being coupled to one another along a perimeter seam.*

*30. The neckpad communications system of claim 29, further comprising a fabric cover over the speaker.*

*31. The neckpad communications system of claim 30, wherein the fabric cover over the speaker is disposed exteriorly to the padded body.*

*32. The neckpad communications system of claim 29, wherein the electronic unit is concealed between the first and second layers.*

* * * * *